United States Patent
Sakuramata et al.

(10) Patent No.: US 9,395,828 B2
(45) Date of Patent: Jul. 19, 2016

(54) ELECTRONIC INFORMATION BOARD APPARATUS, THAT DISPLAYS IMAGE INPUT FROM EXTERNAL APPARATUS

(71) Applicants: Yoshifumi Sakuramata, Kanagawa (JP); Masaaki Kagawa, Tokyo (JP); Eiji Kemmochi, Tokyo (JP); Kuangyi Zhu, Kanagawa (JP); Hiroko Mano, Tokyo (JP)

(72) Inventors: Yoshifumi Sakuramata, Kanagawa (JP); Masaaki Kagawa, Tokyo (JP); Eiji Kemmochi, Tokyo (JP); Kuangyi Zhu, Kanagawa (JP); Hiroko Mano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 289 days.

(21) Appl. No.: 13/693,371

(22) Filed: Dec. 4, 2012

(65) Prior Publication Data
US 2013/0147736 A1 Jun. 13, 2013

(30) Foreign Application Priority Data
Dec. 9, 2011 (JP) .................. 2011-270235

(51) Int. Cl.
| G06F 3/041 | (2006.01) |
| G06F 3/044 | (2006.01) |
| G06F 3/038 | (2013.01) |
| G06F 3/0488 | (2013.01) |
| G06F 3/0481 | (2013.01) |

(52) U.S. Cl.
CPC .............. *G06F 3/041* (2013.01); *G06F 3/038* (2013.01); *G06F 3/04817* (2013.01); *G06F 3/04886* (2013.01)

(58) Field of Classification Search
CPC ..... G06F 3/044; H04N 5/23296; G06T 11/60
USPC ................ 345/173–174; 178/18.06; 396/100; 382/282; 358/1.9, 478; 715/764
See application file for complete search history.

(56) References Cited

U.S. PATENT DOCUMENTS

| 5,644,737 A * | 7/1997 | Tuniman .............. G06F 3/0481 715/810 |
| 6,507,339 B1 * | 1/2003 | Tanaka .......................... 345/178 |
| 2001/0012001 A1 * | 8/2001 | Rekimoto et al. ............ 345/173 |
| 2002/0054377 A1 * | 5/2002 | Ouchi ................. H04N 1/00204 358/478 |
| 2002/0064382 A1 * | 5/2002 | Hildreth et al. ............... 396/100 |
| 2002/0075250 A1 * | 6/2002 | Shigeta .................... H04L 29/06 345/204 |
| 2004/0263887 A1 * | 12/2004 | Kotani ..................... H04N 1/56 358/1.9 |
| 2009/0144644 A1 * | 6/2009 | Chaudhri .............. G06F 3/0481 715/764 |
| 2009/0154833 A1 * | 6/2009 | Sakaue et al. .................. 382/282 |
| 2009/0160793 A1 * | 6/2009 | Rekimoto ...................... 345/173 |
| 2012/0032976 A1 | 2/2012 | Nagahara et al. |
| 2012/0050197 A1 | 3/2012 | Kemmochi |
| 2012/0062591 A1 | 3/2012 | Omura et al. |
| 2012/0206387 A1 | 8/2012 | Omura et al. |
| 2012/0235934 A1 | 9/2012 | Kawasaki et al. |

FOREIGN PATENT DOCUMENTS

| JP | 2001-306210 | 11/2001 |
| JP | 4244075 | 3/2009 |

* cited by examiner

*Primary Examiner* — Jonathan Boyd
*Assistant Examiner* — James Nokham
(74) *Attorney, Agent, or Firm* — IPUSA, PLLC

(57) ABSTRACT

An electronic information board apparatus includes an extraction part configured to extract an operation area from an image input to the electronic information board; a display part configured to reconfigure the extracted operation area and display the reconfigured operation area at a predetermined position of a display screen; a correlation part configured to correlate the coordinates of the operation area and the coordinates of the reconfigured operation area; and a conversion part configured to convert an operation on the coordinates of the reconfigured operation area into an operation on the coordinates of the operation area.

12 Claims, 13 Drawing Sheets

FIG.5

RECONFIGURED OPERATION AREA IMAGE MANAGEMENT TABLE

| ITEM ID | IMAGE INFORMATION | ... |
|---------|-------------------|-----|
| 001 | IMAGE INFORMATION D11 | ... |
| 002 | IMAGE INFORMATION D12 | ... |
| ... | ... | ... |

FIG.6A

COORDINATE CONVERSION TABLE

| ITEM ID | ELECTRONIC BOARD SCREEN COORDINATES | TARGET PC | PC SCREEN COORDINATES |
|---|---|---|---|
| 001 | (1100, 1300, 1900, 1350) | 1 | (0, 50, 1920, 100) |
| 002 | (1100, 1350, 1900, 1399) | 1 | (0, 1300, 1900, 1399) |

FIG.6B

COORDINATE CONVERSION TABLE

| ITEM ID | ELECTRONIC BOARD SCREEN COORDINATES | TARGET PC | PC SCREEN COORDINATES |
|---|---|---|---|
| 001 | (1850, 1200, 1920, 1249) | 1 | (1100, 50, 1299, 99) |
| 002 | (1850, 1250, 1920, 1299) | 1 | (1300, 50, 1499, 99) |
| 003 | (1850, 1300, 1920, 1349) | 1 | (1500, 50, 1699, 99) |
| 004 | (1850, 1350, 1920, 1399) | 1 | (1700, 50, 1899, 99) |

FIG.7

| ITEM | VALUE |
|---|---|
| REDUCTION RATE | 1.0 |
| VERTICAL DISPLAY POSITION | CENTER |
| HORIZONTAL DISPLAY POSITION | BUTTON OPERATING SIDE |
| DISPLAY ARRANGEMENT | VERTICAL STACK |
| ... | ... |

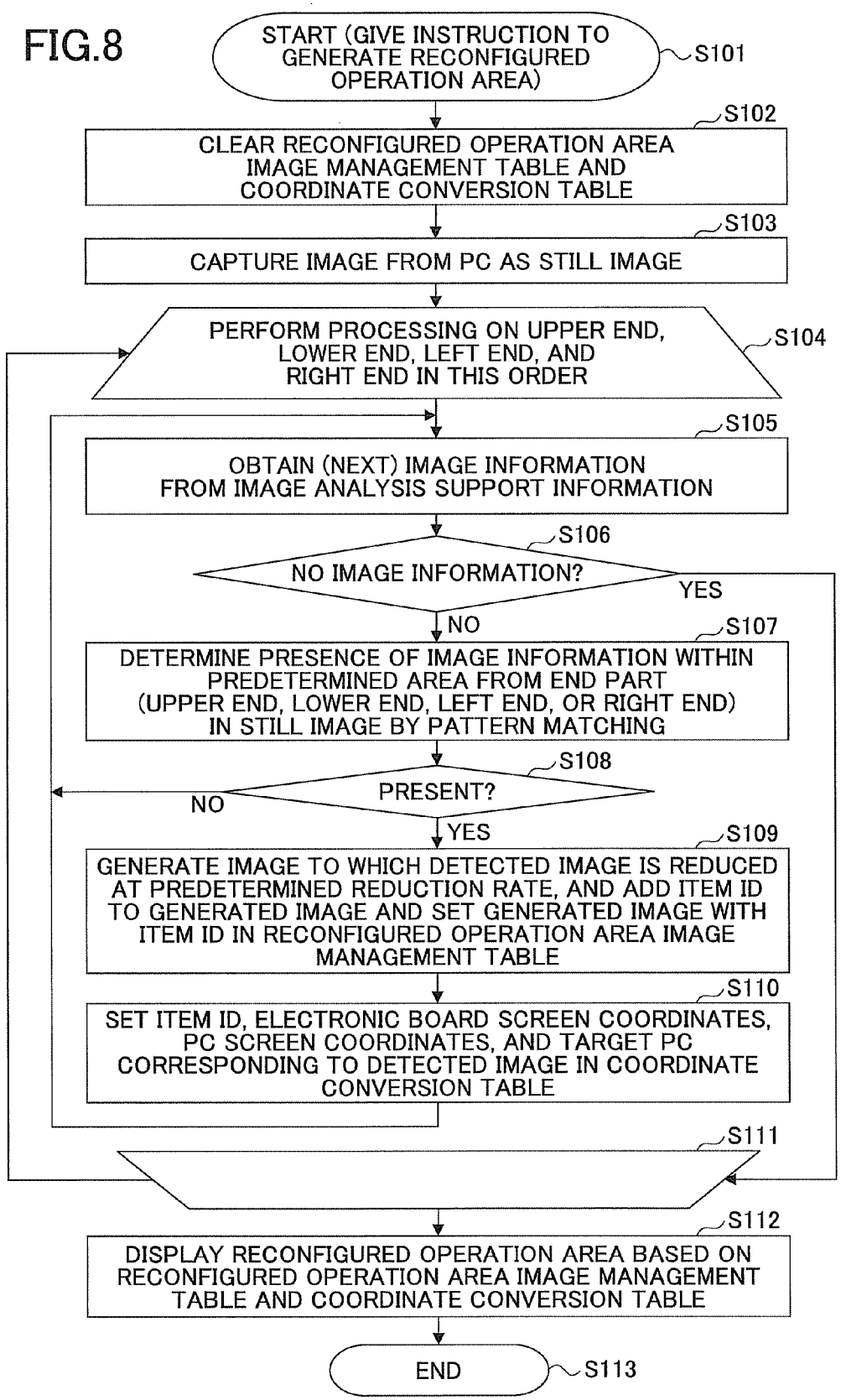

P

P

//page break
ELECTRONIC INFORMATION BOARD APPARATUS, THAT DISPLAYS IMAGE INPUT FROM EXTERNAL APPARATUS

CROSS-REFERENCE TO RELATED APPLICATION

The present application is based upon and claims the benefit of priority of Japanese Patent Application No. 2011-270235, filed on Dec. 9, 2011, the entire contents of which are incorporated herein by reference.

BACKGROUND OF THE INVENTION

1. Field of the Invention

The present invention relates to an electronic information board apparatus, an electronic information board system, and a method of controlling an electronic information board apparatus.

2. Description of the Related Art

Electronic information board apparatuses have been commercially available that include a large-size display such as a liquid crystal panel or a plasma display, a coordinate detecting part that detects the position (coordinates) of contact by a pen or a finger on the screen of the display, such as a touchscreen or a touchscreen panel, and an interface with an external terminal apparatus such as a personal computer (PC).

This kind of electronic information board apparatus includes functions such as a function of magnifying and displaying the screen of a connected terminal apparatus, a function of operating the terminal apparatus with the motion of a pen or a finger, a function of magnifying and displaying content in a server on a network, and a function of allowing handwriting input with the motion of a pen or a finger like a white board or a blackboard.

Since the electronic information board apparatus allows the screen of a connected terminal apparatus to be displayed on a larger scale so as to allow multiple persons to view the screen in a conference room or the like, the electronic information board apparatus is often used for presentation or the like. Further, unlike projectors that project a screen onto a wall surface, the electronic information board apparatus does not necessitate darkening the room because of its bright screen. Therefore, the electronic information board apparatus has the advantage of making it possible to allow a person to view materials in front or take notes while displaying a screen.

Further, the electronic information board apparatus also makes it possible to operate a terminal apparatus outputting displayed content by directly touching a displayed screen instead of operating the mouse or keyboard of the terminal apparatus. This makes it easier for a person to make a presentation and operate the terminal apparatus alone beside a display remote from the terminal apparatus.

SUMMARY OF THE INVENTION

According to an aspect of the present invention, an electronic information board apparatus includes an extraction part configured to extract an operation area from an image input to the electronic information board; a display part configured to reconfigure the extracted operation area and display the reconfigured operation area at a predetermined position of a display screen; a correlation part configured to correlate coordinates of the operation area and coordinates of the reconfigured operation area; and a conversion part configured to convert an operation on the coordinates of the reconfigured operation area into an operation on the coordinates of the operation area.

According to an aspect of the present invention, an electronic information board system includes an external apparatus; and an electronic information board apparatus connected to the external apparatus, the electronic information board apparatus including an extraction part configured to extract an operation area from an image input to the electronic information board from the external apparatus; a display part configured to reconfigure the extracted operation area and display the reconfigured operation area at a predetermined position of a display screen; a correlation part configured to correlate coordinates of the operation area and coordinates of the reconfigured operation area; and a conversion part configured to convert an operation on the coordinates of the reconfigured operation area into an operation on the coordinates of the operation area.

According to an aspect of the present invention, a method of controlling an electronic information board apparatus includes extracting an operation area from an image input to the electronic information board; reconfiguring the extracted operation area and displaying the reconfigured operation area at a predetermined position of a display screen; correlating coordinates of the operation area and coordinates of the reconfigured operation area; and converting an operation on the coordinates of the reconfigured operation area into an operation on the coordinates of the operation area.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating a reconfigured operation area image management table according to an embodiment;

FIGS. 6A and 6B are diagrams illustrating coordinate conversion tables according to an embodiment;

FIG. 7 is a diagram illustrating settings information according to an embodiment;

FIG. 8 is a flowchart illustrating a process according to an embodiment;

DETAILED DESCRIPTION OF THE PREFERRED EMBODIMENTS

Figure 1:
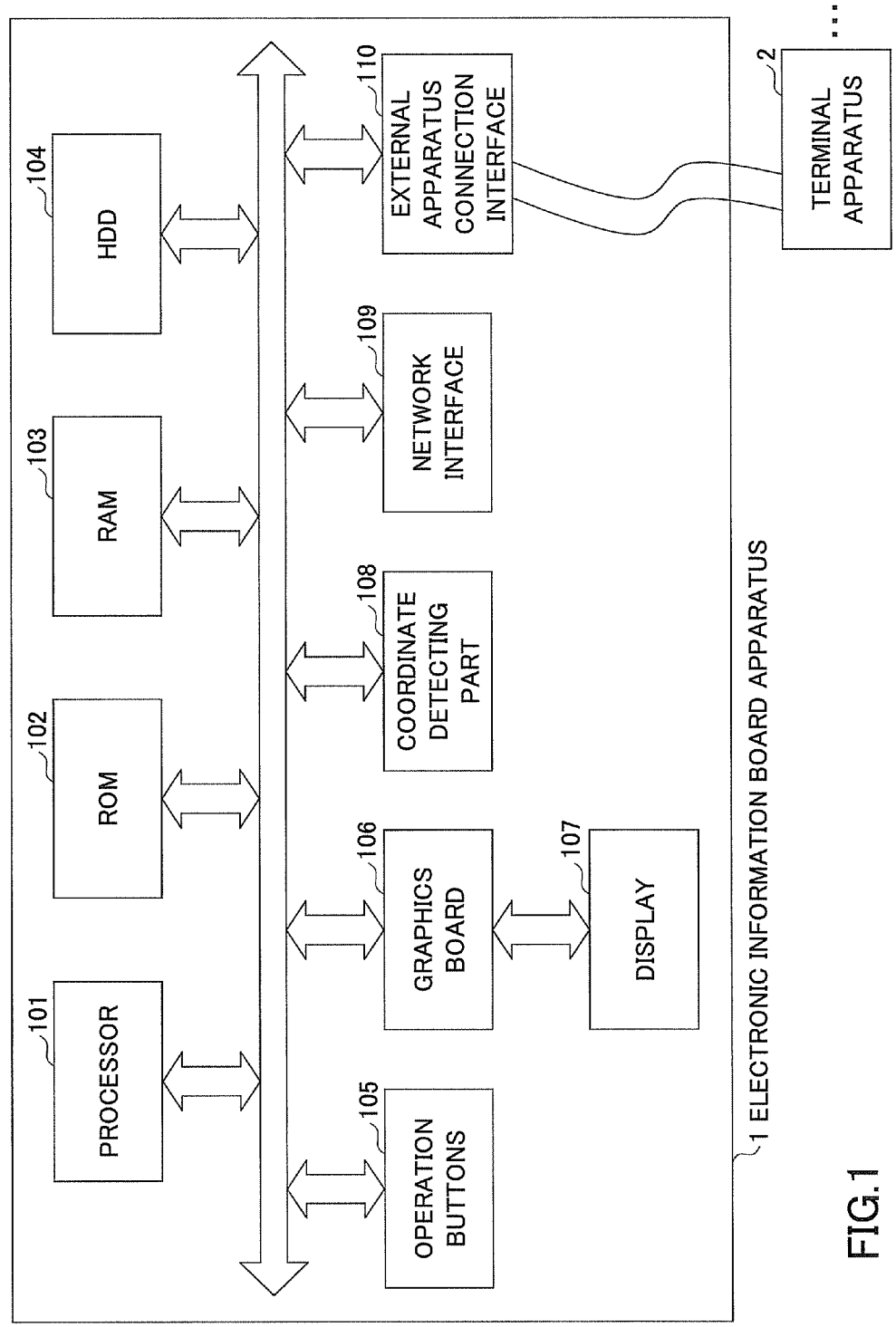
FIG. 1 is a block diagram illustrating a configuration of an electronic information board apparatus according to an embodiment.

There has been a significant increase in the size of the display of the above-described kind of electronic information board apparatus. Therefore, in the case of directly displaying a PC screen and making input from the touchscreen of the electronic information board apparatus, a large motion such as stretching an arm to operate a corresponding part is necessary, thus making operations burdensome. In the case where a vertically-challenged person or a person in a wheelchair performs an operation, the person may not reach an operation button or the like of an application by stretching the arm if the operation button or the like is located at the upper end of the screen. Further, even a person who is not vertically challenged or in a wheelchair has to go across the screen to perform an operation and is prevented from making a smooth presentation even when the operation button or the like is vertically located at a position within arm's reach, if the operation button or the like is on the other side of the screen relative to where the person stands.

In order to solve similar problems, Japanese Patent No. 4244075 discloses separately providing a touchscreen part of easily operable size to which a display screen is reduced. However, providing a touchscreen for operations separately from a large display screen necessitates a certain amount of cost. Further, when the area of the touchscreen for operations is reduced, operation buttons and the interval between operation buttons also are reduced because of a reduced scale, thus making it difficult to perform an operation. Further, preparing a large touchscreen to ensure operability causes a further increase in manufacturing cost and is thus difficult. Therefore, in some cases, a notebook personal computer or the like that contains display content is placed nearby and used. However, recently, data on a server may be referred to or content in a PC on one's desk may be displayed by remote control. Therefore, this method is not always effective.

It is also possible to use part of a large touchscreen part to place reduced display on the screen. However, part of the large display panel is used for operations alone, thus preventing effective use of the large display screen. In particular, for presentations or the like, it is desirable to reserve as large a display area as possible, so that it is desired to reduce an area necessary for operations.

According to an aspect of the present invention, an electronic information board apparatus, an electronic information board system, and a method of controlling an electronic information board apparatus are provided that make it possible to perform an operation for an application without making a large motion and to make effective use of a display screen by reducing influence on what is supposed to be displayed.

According to an aspect of the present invention, it is possible to perform an operation for an application without making a large motion and to make effective use of a display screen by reducing influence on what is supposed to be displayed.

A description is given below of one or more embodiments of the present invention.

FIG. 1 is a block diagram illustrating a configuration of an electronic information board apparatus 1 according to an embodiment of the present invention.

Referring to FIG. 1, the electronic information board apparatus 1 includes a processor 101, a read-only memory (ROM) 102, a random access memory (RAM) 103, a hard disk drive (HDD) 104, operation buttons 105, a graphics board 106, a display 107, a coordinate detecting part 108, a network interface 109, and an external apparatus connection interface 110.

The processor 101 is a device (control part) that performs operations on processes executed by the electronic information board apparatus 1. Examples of the processor 101 may include various kinds of processors such as central processing unit (CPU)s and microprocessor unit (MPU)s like PENTIUM (registered trademark), Athlon, etc.

The ROM 102 is a nonvolatile memory that stores a boot program such as BIOS.

The RAM 103 is a volatile or nonvolatile memory that provides space for executing a program in the processor 101. The processor 101 implements functional parts to be described below in the electronic information board apparatus 1 by loading and executing a program coded in a programming language such as an assembler, C, C++, Java (registered trademark), JavaScript (registered trademark), Perl, Ruby, or Python under the control of an operating system (OS).

The HDD 104 is a large-capacity nonvolatile memory, in which various operating systems that control the entire system of the electronic information board apparatus 1 may be stored, such as a series of Windows (registered trademark) operating systems, UNIX (registered trademark), Linux (registered trademark), Android (registered trademark), ITRON, and μITRON. Further, various data are stored in the HDD 104, such as the device drivers of the graphics board 106, the display 107, and the coordinate detecting part 108 and programs for primary processes. Programs for primary processes may be stored in and installed from a computer-readable recording medium such as a CD-ROM, a magneto-optical (MO) disk, a flexible disk, an electrically erasable programmable read-only memory (EEPROM), or an erasable programmable read-only memory (EPROM), or may be installed via a network.

The operation buttons 105 are hardware buttons operable by a user, which are provided on an external surface of the housing of the electronic information board apparatus 1.

The graphics board 106, which is a device that processes rendering data to be rendered on the display 107, includes a video RAM (VRAM) that retains images and connection terminals of the display 107.

The display 107 is a display device that renders rendering data generated by the graphics board 106.

The coordinate detecting part 108 is a detector that detects the contact or approach of an object such as a pen or a finger. Examples of the coordinate detecting part 108 include a touchscreen (panel) with a capacitive sensor that detects capacitance that is caused to change by the contact of an object, a touchscreen (panel) with a pressure sensor that detects the contact pressure of an object, and an optical detector that detects the approach of an object to or the contact of an object with the display 107 by detecting the interruption of light in one direction emitted parallel to the surface of the display 107 or light in the two directions of a vertical direction and a horizontal direction.

The network interface 109, which is an interface that connects to an external network, is a physical interface such as a local area network (LAN) cable connector or a modular cable connector.

The external apparatus connection interface 110, which is an interface for connecting a terminal apparatus 2 such as a PC to the electronic information board apparatus 1, is a physical interface including a video graphics array (VGA) input connector and a universal serial bus (USB) port. Multiple terminal apparatuses 2 may be connected to the external apparatus connection interface 110. The terminal apparatus 2 may be connected to the electronic information board apparatus 1 wirelessly, for example, by WiFi.

Figure 2:
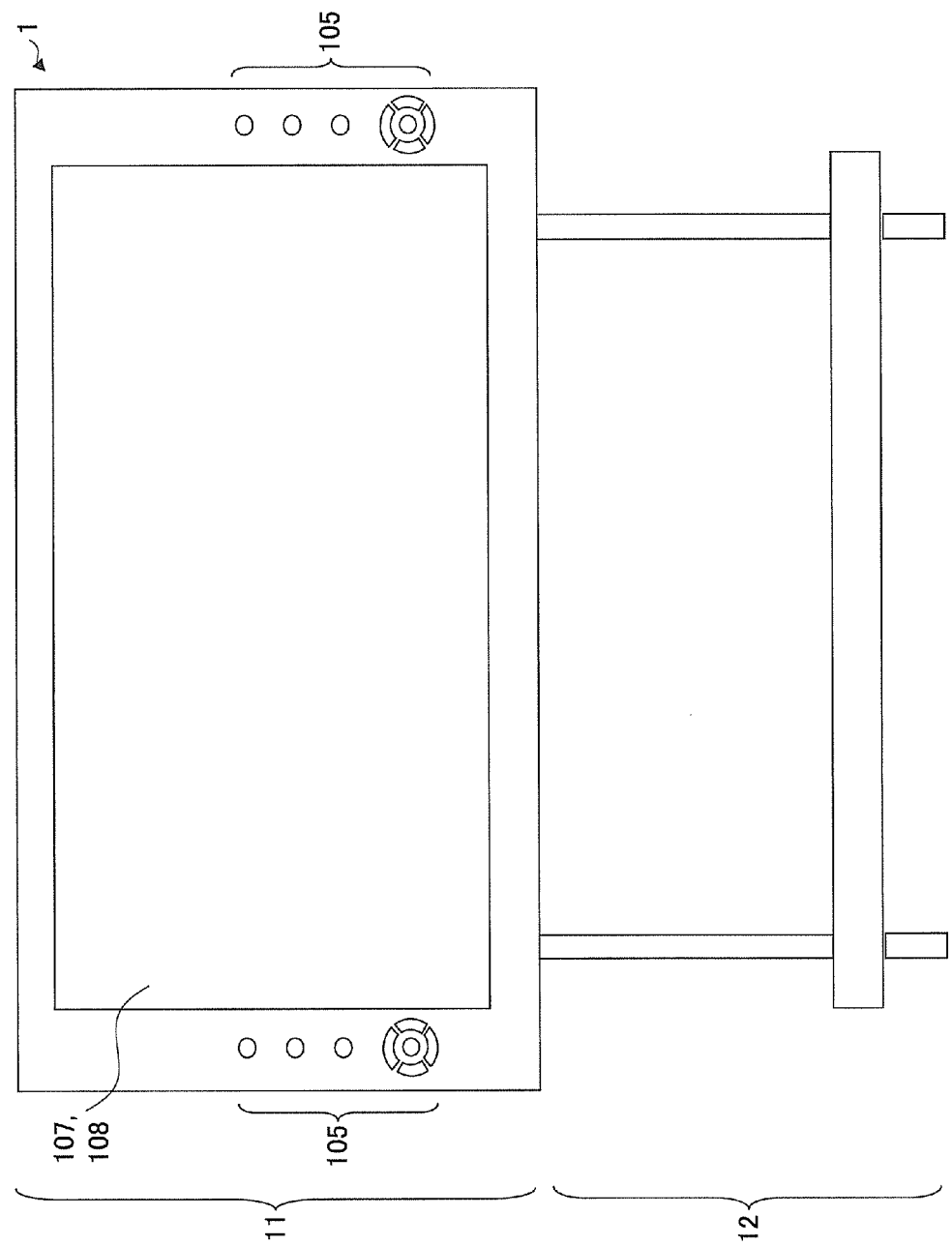
FIG. 2 is a diagram illustrating an exterior of the electronic information board apparatus of FIG. 1.

FIG. 2 is a diagram illustrating an exterior of the electronic information board apparatus 1.

Referring to FIG. 2, the electronic information board apparatus 1 includes a body part 11 and a leg part 12. The display 107 and the coordinate detecting part 108 are provided on the front side of the body part 11. The operation buttons 105 are provided on each of the lateral sides of the body part 11.

Figure 3:
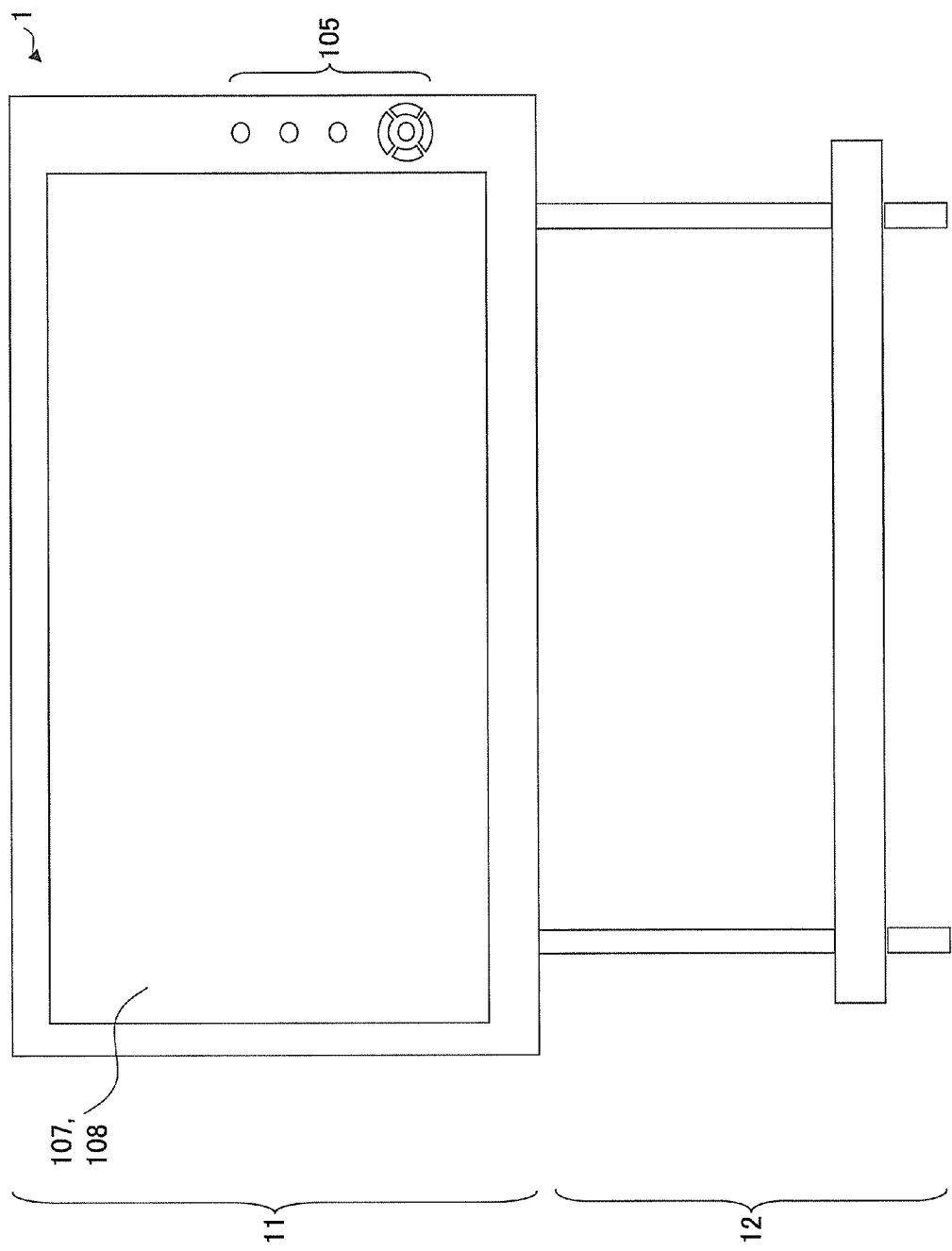
FIG. 3 is a diagram illustrating another exterior of the electronic information board apparatus of FIG. 1.

FIG. 3 is a diagram illustrating another exterior of the electronic information board apparatus 1, in which the operation buttons 105 are provided on one of the lateral sides of the body part 11.

FIG. 4, FIG. 5, FIGS. 6A and 6B, and FIG. 7 are diagrams illustrating data used in processes such as primary processes according to embodiments.

Figure 4:
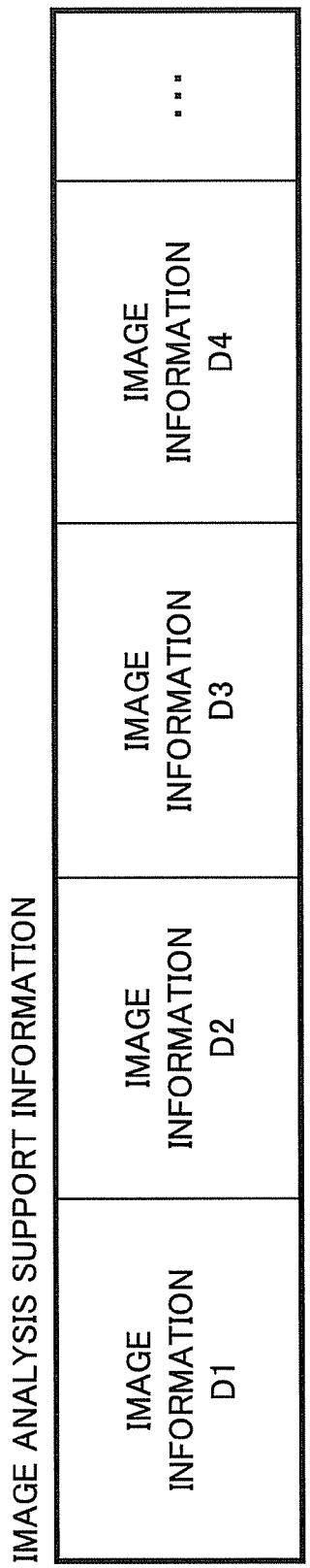
FIG. 4 is a diagram illustrating image analysis support information according to an embodiment.

FIG. 4 is a diagram illustrating image analysis support information that retains reference images for extracting operation buttons or the like from within an application screen. The image analysis support information includes multiple image information items. The image information items are the images of operation buttons or the like included in the screen of an application expected to be used. The image information may be provided with search area coordinates on a screen on an image information item basis.

FIG. 5 is a diagram illustrating a reconfigured operation area image management table that manages each of items in a reconfigured operation area (region) reconfigured by extracting operation buttons or the like from an application screen. The reconfigured operation area image management table includes items such as Item ID and Image Information. The item "Item ID" is information that uniquely identifies each of items corresponding to operation buttons or the like, which items constitute the reconfigured operation area. The table item "Image Information" is the image data of the items. A single item may be correlated with one of operation buttons or the like having different functions, or may be correlated with a group of adjacent operation buttons. The table item "Image Information" of an item may be equal in size to or smaller in size than the original image of a corresponding operation button or the like (of the application). Further, the table item "Image Information" may be a prepared image different from the original image to replace the original image.

FIGS. 6A and 6B are diagrams illustrating coordinate conversion tables for performing conversion into PC screen coordinates when the items of the reconfigured operation area are touched. The coordinate conversion tables include items such as Item ID, Electronic Board Screen Coordinates, Target PC, and PC Screen Coordinates, and correlate electronic board screen coordinates and corresponding PC screen coordinates on an item (ID) basis, for example. The table item "Item ID" is information that uniquely identifies each of items corresponding to operation buttons or the like, which items constitute the reconfigured operation area. The table item "Electronic Board Screen Coordinates" is information on coordinates that indicate the respective areas of the items on the electronic information board screen. The table item "Target PC" is information that identifies the terminal apparatus 2 on which the displayed application runs and to which a mouse event is to be transmitted. The table item "PC Screen Coordinates" is information on coordinates that indicate the respective areas of the items on the screen of the terminal apparatus 2.

FIG. 6A corresponds to the case of reducing (in size) horizontally elongated items at the upper end and the lower end of the PC screen and displaying the size-reduced items in a stacked manner on the right side at the lower end of the electronic information board screen. FIG. 6B corresponds to the case of reducing (in size) four adjacent items on the right side at the upper end of the PC screen and displaying the size-reduced four items in a stacked manner on the right side at the lower end of the electronic information board screen.

FIG. 7 is a diagram illustrating settings information provided by a user, which determines the display pattern of the reconfigured operation area. The settings information includes items such as Reduction Rate, Vertical Display Position, Horizontal Display Position, and Display Arrangement. The item "Reduction Rate" is a rate at which the image of an operation button or the like extracted from the PC screen is reduced. The item "Vertical Display Position" is the display position of the reconfigured operation area in a vertical (top-bottom) direction on the electronic information board screen. The vertical display position may be roughly specified as, for example, "Top," "Center," or "Bottom," or be specified by a distance or percentage from one end. The item "Horizontal Display Position" is the display position of the reconfigured operation area in a horizontal (right-left) direction on the electronic information board screen. The horizontal display position may be roughly specified as, for example, "Left," "Center," or "Right," or be specified by a distance or percentage from one end. The item "Display Arrangement" is a method of arranging the items of the reconfigured operation area. It is possible to specify an arrangement such as "Vertical Stack" or "Side-by-Side (Horizontal) Arrangement."

FIG. 8 is a flowchart illustrating a process according to an embodiment. FIG. 8 illustrates a process in the case where the operation buttons 105 or the like are operated so that an instruction is given for generating a reconfigured operation area.

Referring to FIG. 8, in step S101, the processor 101 (control part) starts a process when one or more of the operation buttons 105 are operated so that an instruction is given for generating a reconfigured operation area. Then, in step S102, the processor 101 clears the reconfigured operation area image management table (FIG. 5) and the coordinate conversion table (FIG. 6A or 6B).

Next, in step S103, the processor 101 captures an image (video) from the terminal apparatus 2 such as a PC as a still image.

Next, the processor 101 repeatedly performs a process (step S104 through step S111) on the upper end, the lower end, the left end, and the right end of the still image, which are subjected to the process in this order. If the image information of the image analysis support information (FIG. 4) is provided with search area coordinates on the screen on an image information item basis, the process may be executed on the respective search areas of the individual image information items without making distinctions between search areas, such as the upper end, the lower end, the left end, and the right end.

In the above-described repeated process, first, in step S105, the processor 101 obtains one of the image information items from the image analysis support information. (The image information items are obtained one at a time in order of arrangement, starting with a leading image information item the first time, followed by the subsequent image information item the next time.)

Next, in step S106, the processor 101 determines whether there is no image information in the image analysis support information.

If the processor 101 determines that there is no image information in the image analysis support information (YES in step S106), the processor 101 proceeds to the next round of the repeated process (steps S111 and S104).

If the processor 101 determines that there is image information in the image analysis support information (NO in step S106), in step S107, the processor 101 searches a predetermined area from an end part (the upper end, the lower end, the left end, or the right end) of the still image, using pattern matching, for the image information obtained from the image analysis support information. For example, the processor 101 divides the still image into rectangular areas of a predetermined width, and determines image matching by scanning each rectangular area by moving the reference position of the image information (for example, the upper left end of the image) pixel by pixel in the rectangular area. If the instruction for generating a reconfigured operation area is given with a direction key of the operation buttons 105, the area to be searched at the time of reconfiguration (of the operation area) may be changed (determined) according to a direction corresponding to the direction key pressed. For example, the upper end of the screen may be searched in response to the pressing of an upward direction key, the lower end of the screen may be searched in response to the pressing of a downward direction key, the right end of the screen may be searched in response to the pressing of a rightward direction key, and the left end of the screen may be searched in response to the pressing of a leftward direction key.

Next, in step S108, the processor 101 determines whether the image information obtained from the image analysis support information is present (included) in the still image.

If the processor 101 determines that the image information obtained from the image analysis support information is not present in the still image (NO in step S108), the processor 101 returns to step S105 to obtain the next image information.

If the processor 101 determines that the image information obtained from the image analysis support information is present in the still image (YES in step S108), in step S109, the processor 101 generates an image to which the detected image is reduced at a predetermined reduction rate (FIG. 7), and adds an item ID to the generated (reduced) image and sets the generated image with the item ID in the reconfigured operation area image management table (FIG. 5).

Next, in step S110, the processor 101 sets the item ID, electronic board screen coordinates, PC screen coordinates, and target PC that correspond to the detected image in the coordinate conversion table (FIG. 6A or 6B), and returns to step S105 to obtain the next image information. Here, the electronic board screen coordinates are determined according to the vertical display position, horizontal display position, and display arrangement of the settings information (FIG. 7). The PC screen coordinates are the original coordinates at which the image has been detected. A position at which a user stands (a user's standing position) may be detected, so that the reconfigured operation area may be displayed on the side closer to the user's standing position. For example, in the case where the operation buttons 105 are provided on each side of the housing of the electronic information board apparatus 1, the user's standing position may be calculated (determined) based on which side the pressed one or more operation buttons 105 are on. The user's standing position may be detected (determined) with a human body sensor using far-infrared radiation, or the like.

In response to the completion of the repeated process with respect to each of the end parts (the upper end, lower end, left end, and right end) of the still image (that is, after step S111), in step S112, the processor 101 displays the reconfigured operation area on the display 107 based on the reconfigured operation area image management table and the coordinate conversion table, and in step S113, ends the process.

Figure 9A:
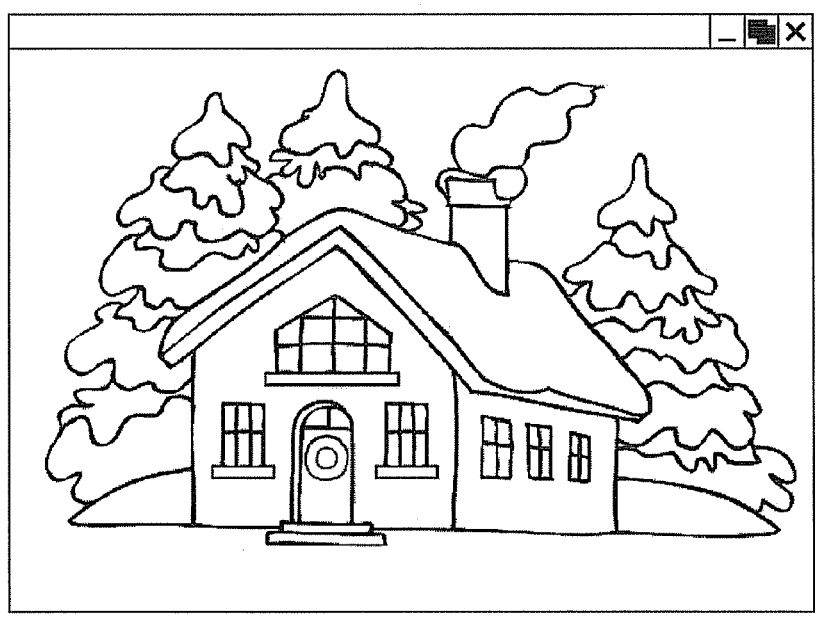
FIG. 9A is a diagram illustrating an original image transmitted from a terminal apparatus.
Figure 9B:
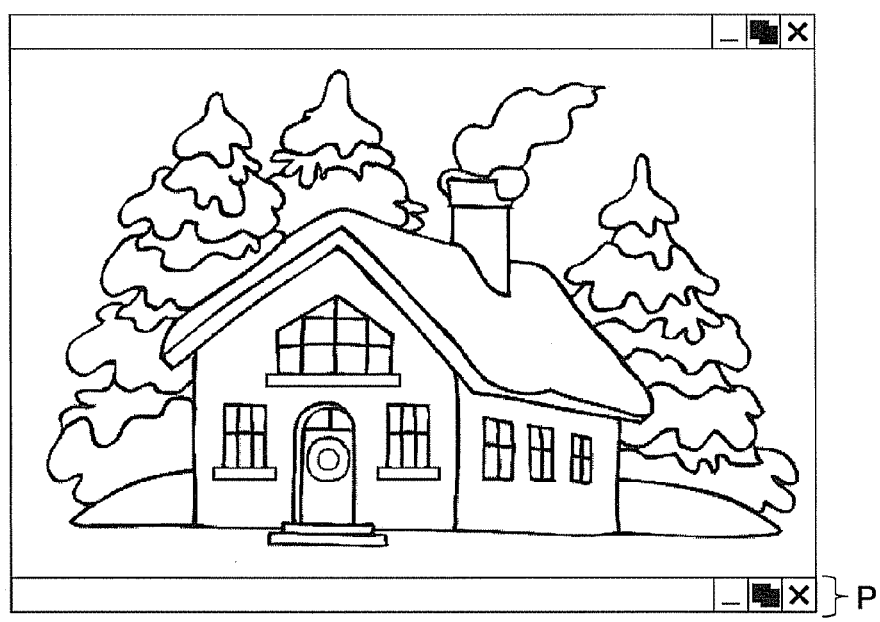
FIG. 9B is a diagram illustrating a display example of a reconfigured operation area according to an embodiment.
Figure 10A:
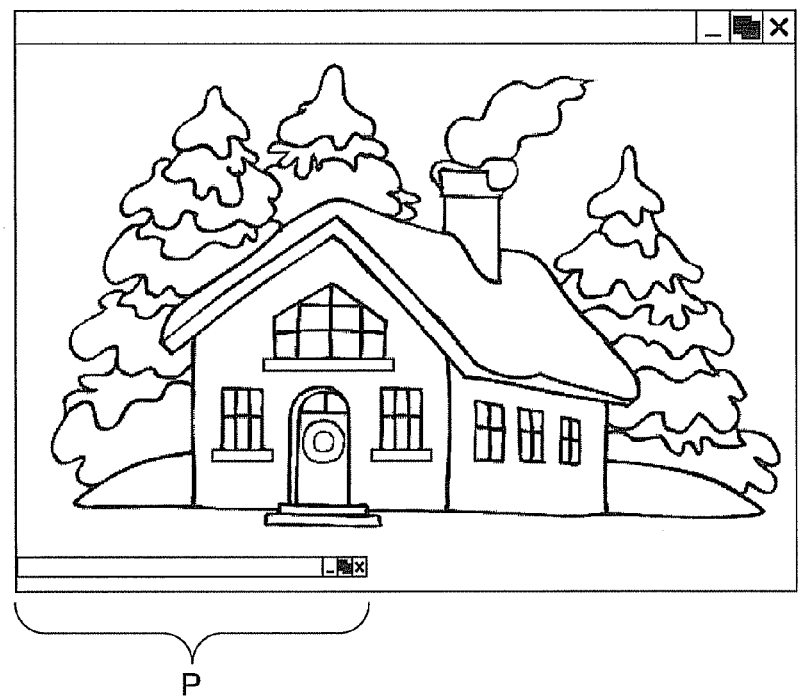
FIG. 10A is a diagram illustrating a display example of the reconfigured operation area according to an embodiment.
Figure 10B:
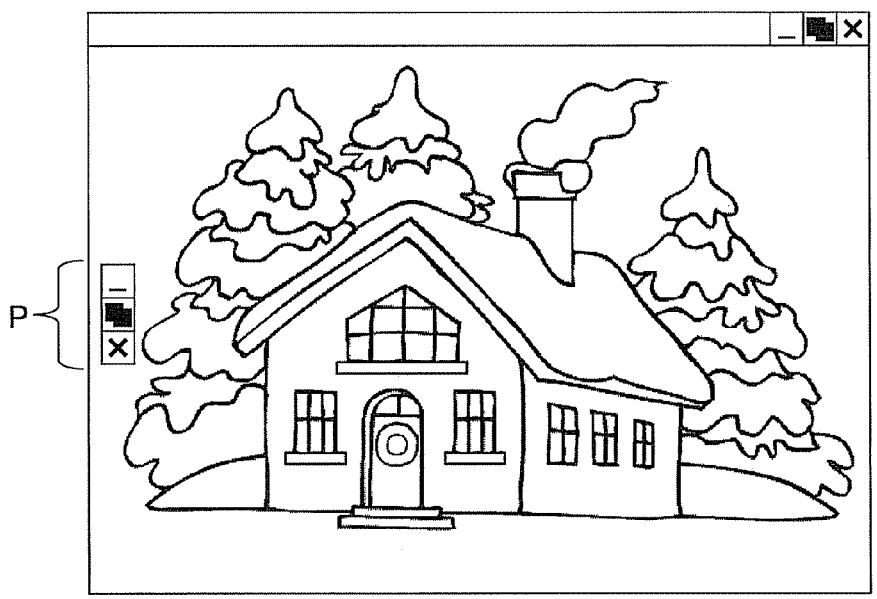
FIG. 10B is a diagram illustrating a display example of the reconfigured operation area according to an embodiment.

FIG. 9A illustrates the original image transmitted from the terminal apparatus 2, and FIG. 9B illustrates a state where a bar including a group of buttons at the upper end of the original image is displayed in the same size as a reconfigured operation area P at the lower end of the screen. FIG. 10A illustrates a state where the bar including a group of buttons at the upper end of the original image is reduced in size and displayed as the reconfigured operation area P at the lower left end of the screen. Further, FIG. 10B illustrates a state where the bar including a group of buttons at the upper end of the original image is rearranged in a vertically stacked manner and displayed in the same size as the reconfigured operation area P at the center of the left end of the screen.

Figure 11:
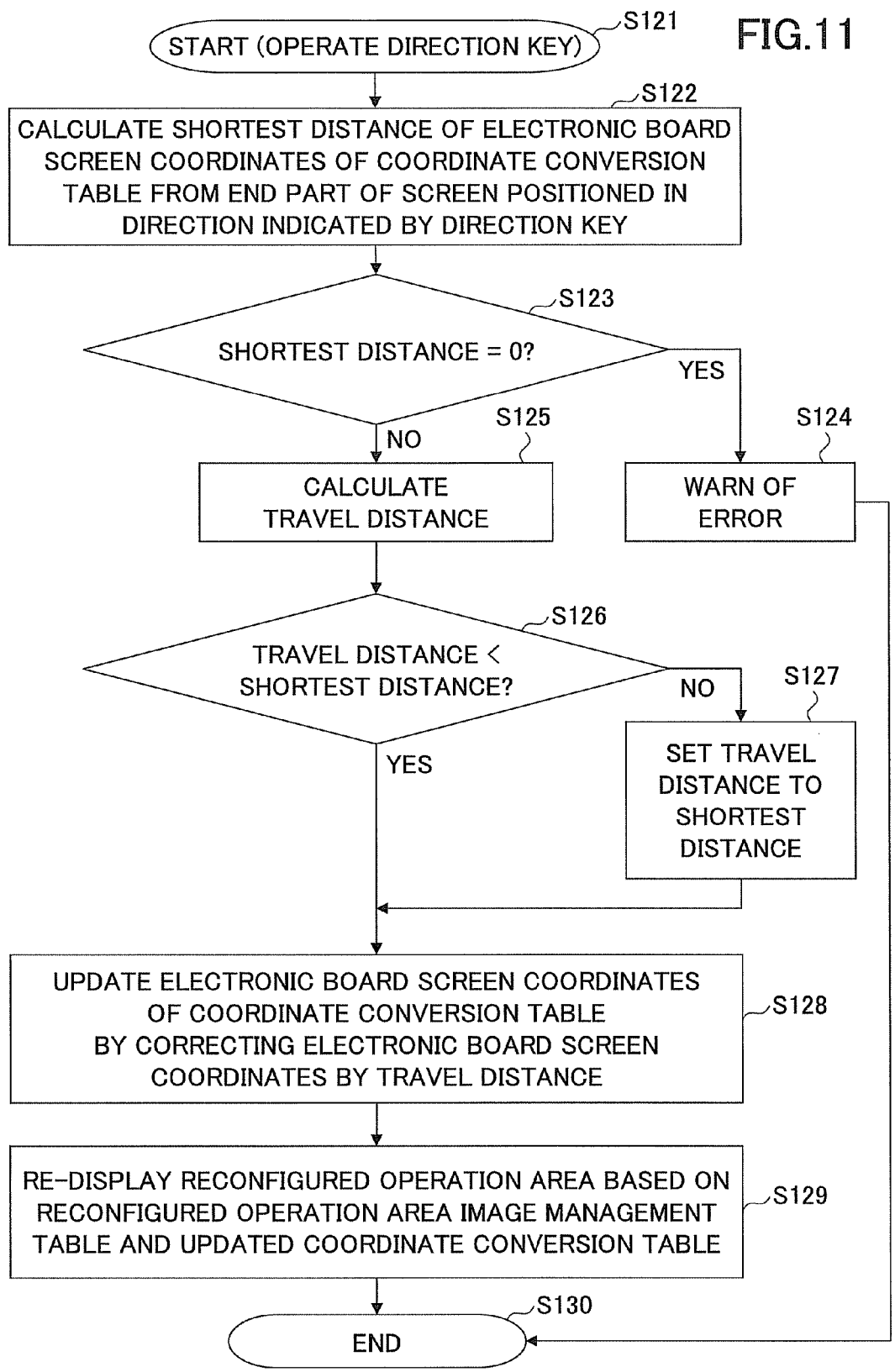
FIG. 11 is a flowchart illustrating a process according to an embodiment.

FIG. 11 illustrates a process in the case of changing the display position of the reconfigured operation area by operating a direction key of the operation buttons 105.

Referring to FIG. 11, in step S121, the processor 101 (control part) starts a process in response to the operation of a direction key. Then, in step S122, the processor 101 calculates the shortest distance of the electronic board screen coordinates of the coordinate conversion table (FIG. 6A or 6B) from the end part of the screen positioned in the direction indicated by the direction key.

Next, in step S123, the processor 101 determines whether the calculated shortest distance is zero (0).

If the processor 101 determines that the shortest distance is zero (YES in step S123), in step S124, the processor 101 warns of an error using a beep sound or the like, and in step S130, ends the process.

If the processor 101 determines that the shortest distance is not zero (NO in step S123), in step S125, the processor 101 calculates a travel distance (amount) from the number of times the direction key has been operated and a unit travel distance (amount).

Next, in step S126, the processor 101 determines whether the travel distance is less than the shortest distance from the end part.

If the processor 101 determines that the travel distance is not less than the shortest distance (NO in step S126), in step S127, the processor 101 sets the travel distance to the shortest distance. If the processor 101 determines that the travel distance is less than the shortest distance (YES in step S126), in step S128, the processor 101 updates the electronic board screen coordinates of the coordinate conversion table (FIG. 6A or 6B) by correcting the electronic board screen coordinates of the coordinate conversion table by the travel distance.

Next, in step S129, the processor 101 re-displays the reconfigured operation area based on the reconfigured operation area image management table and the updated coordinate conversion table, and in step S130, ends the process.

Figure 12:
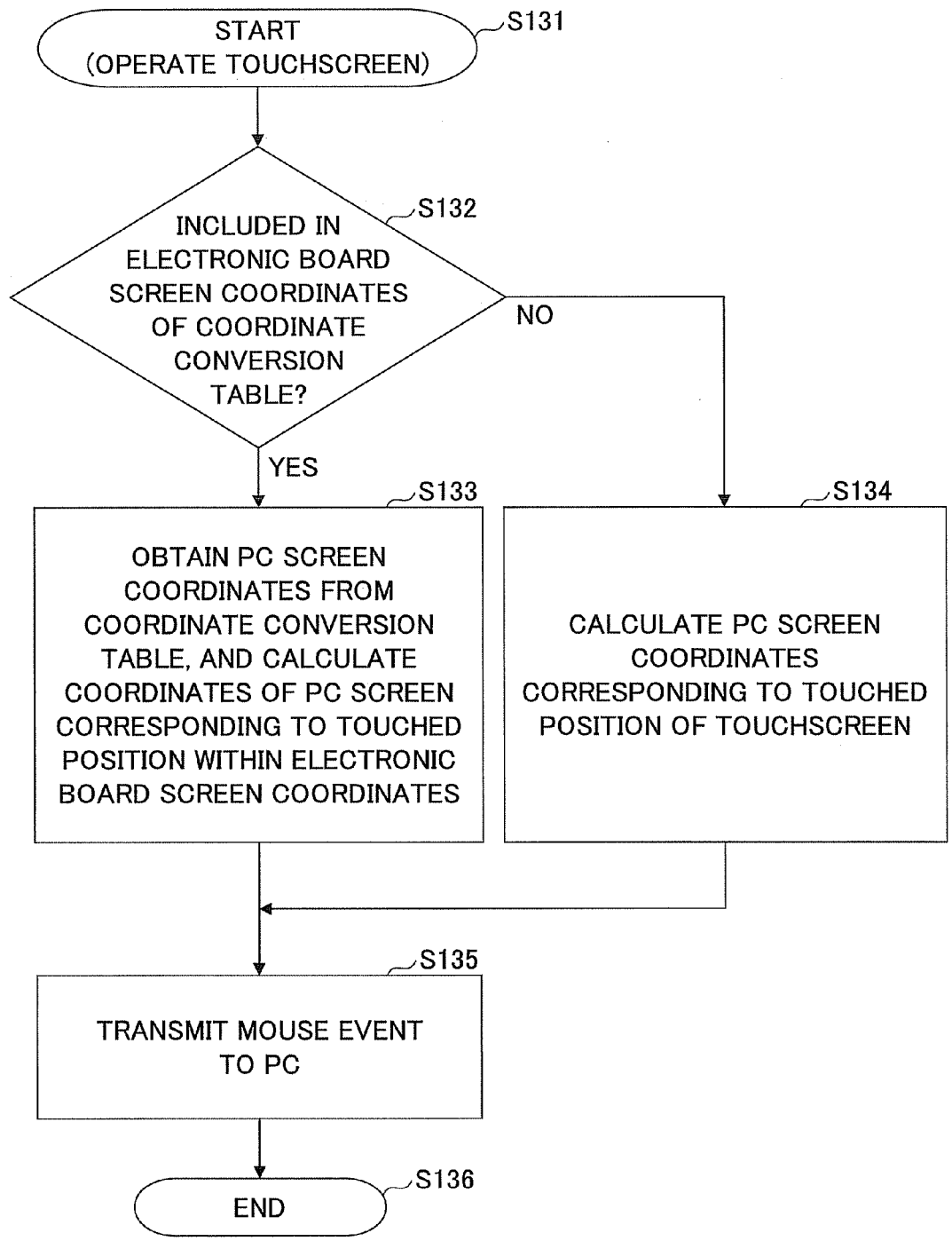
FIG. 12 is a flowchart illustrating a process according to an embodiment.

FIG. 12 illustrates a process in the case where a touchscreen is operated in the coordinate detecting part 108 (FIG. 1).

Referring to FIG. 12, in step S131, the processor 101 (control part) starts a process in response to the operation (for example, touch or contact) of the touchscreen. Then, in step S132, the processor 101 determines whether the detected coordinates of the touchscreen are included in the electronic board screen coordinates of the coordinate conversion table (FIG. 6A or 6B).

If the processor 101 determines that the detected coordinates of the touchscreen are included in the electronic board screen coordinates of the coordinate conversion table (YES in step S132), in step S133, the processor 101 obtains the PC screen coordinates from the coordinate conversion table, and calculates coordinates of the PC screen corresponding to the touched position within the electronic board screen coordinates.

If the processor 101 determines that the detected coordinates of the touchscreen are not included in the electronic board screen coordinates of the coordinate conversion table (NO in step S132), in step S134, the processor 101 calculates coordinates of the PC screen corresponding to the touched position of the touchscreen of the electronic information board apparatus 1.

Then, in step S135, the processor 101 transmits a mouse event (such as a mouse down event, single clicking, or double clicking) corresponding to a touch mode (such as holding a touch, performing touch and release, or performing touch and release twice in a row) with the calculated coordinates to the terminal apparatus 2, and in step S136, ends the process.

Figure 13:
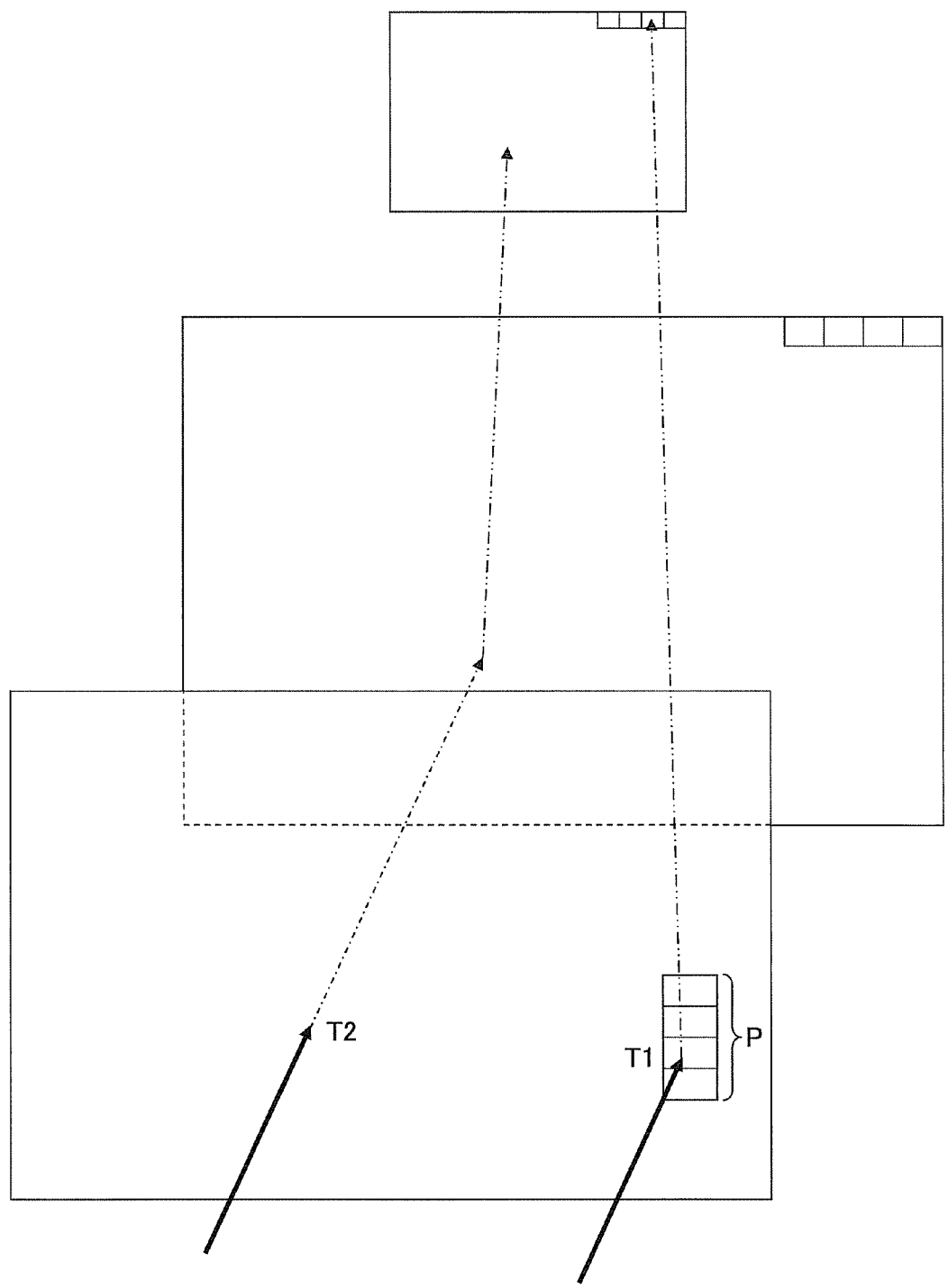
FIG. 13 is a diagram illustrating a difference between a touch on the reconfigured operation area and a touch on a location other than the reconfigured operation area according to an embodiment.

FIG. 13 is a diagram illustrating a difference between a touch (contact) on the reconfigured operation area and a touch (contact) on a location other than the reconfigured operation area. That is, touching Point T1 on the reconfigured operation area P is touching a corresponding operation button or the like on the PC screen. Further, touching Point T2 outside the reconfigured operation area P is touching a relatively corresponding position within the PC screen.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An electronic information board apparatus, comprising:
a reception part configured to receive an image transmitted from an information processing apparatus externally connected to the electronic information board apparatus, wherein the image is displayed on a screen of the externally connected information processing apparatus and includes an instruction image toolbar to be operated for inputting an instruction to cause the externally connected information processing apparatus to process the received image;
an extraction part configured to analyze the received image and extract the instruction image toolbar from the received image, the instruction image toolbar being displayed at first coordinates on the screen of the externally connected information processing apparatus;
a display part configured to reconfigure the extracted instruction image toolbar and display the reconfigured instruction image toolbar at predetermined second coordinates on a screen of the electronic information board apparatus on which the received image is displayed;
a correlation part configured to correlate the first coordinates of the instruction image toolbar before the reconfiguration and the second coordinates of the reconfigured instruction image toolbar, and store the correlation between the first and second coordinates; and
a conversion part configured to convert a first operation performed on the reconfigured instruction image toolbar displayed at the second coordinates on the screen of the electronic information board apparatus into a second operation on the instruction image toolbar before the reconfiguration displayed at the first coordinates on the screen of the externally connected information processing apparatus based on the stored correlation between the first and second coordinates, and transmit information on the second operation to the externally connected information processing apparatus,
wherein the display part is configured to display the extracted instruction image toolbar before the reconfiguration and the reconfigured instruction image toolbar simultaneously on the same screen of the electronic information board apparatus.

2. The electronic information board apparatus as claimed in claim 1, wherein when the extracted instruction image toolbar includes operation buttons arranged side by side in a horizontal direction on the screen of the externally connected information processing apparatus, the display part reconfigures the extracted instruction image toolbar so that the operation buttons are arranged in a vertically stacked manner on the screen of the electronic information board apparatus.

3. The electronic information board apparatus as claimed in claim 1, further comprising:
an additional reception part configured to receive a change in a display position of the reconfigured instruction image toolbar; and
a change part configured to change the second coordinates of the reconfigured instruction image toolbar in accordance with a travel distance corresponding to the received change.

4. The electronic information board apparatus as claimed in claim 1, wherein the extraction part is configured to search the received image for the instruction image toolbar that matches a prestored image and to extract the instruction image toolbar in response to detecting the instruction image toolbar that matches the prestored image.

5. The electronic information board apparatus as claimed in claim 1, wherein the display part is configured to display the reconfigured instruction image toolbar that is reduced in size compared with the instruction image toolbar displayed on the screen of the externally connected information processing apparatus.

6. The electronic information board apparatus as claimed in claim 1, further comprising:
a detection part configured to detect coordinates of a touched position on the screen of the electronic information board apparatus, and determine whether the detected coordinates of the touched position are included in the second coordinates,
wherein the conversion part is configured to
convert the first operation into the second operation and transmit the information on the second operation to the externally connected information processing apparatus, in response to the detection part determining that the detected coordinates of the touched position are included in the second coordinates, and
calculate coordinates of the screen of the information processing apparatus corresponding to the detected coordinates of the touched position, and transmit, along with the calculated coordinates, information on an event corresponding to a mode of touching the position to the information processing apparatus, in response to the detection part determining that the detected coordinates of the touched position are not included in the second coordinates.

7. An electronic information board system, comprising:
an electronic information board apparatus; and
an information processing apparatus externally connected to the electronic information board apparatus,
wherein the electronic information board apparatus includes
a reception part configured to receive an image transmitted from the externally connected information processing apparatus, wherein the image is displayed on a screen of the externally connected information processing apparatus and includes an instruction image toolbar to be operated for inputting an instruction to cause the externally connected information processing apparatus to process the received image;
an extraction part configured to analyze the received image and extract the instruction image toolbar from the received image, the instruction image toolbar being displayed at first coordinates on the screen of the externally connected information processing apparatus;
a display part configured to reconfigure the extracted instruction image toolbar and display the reconfigured instruction image toolbar at predetermined second coordinates on a screen of the electronic information board apparatus on which the received image is displayed;
a correlation part configured to correlate the first coordinates of the instruction image toolbar before the reconfiguration and the second coordinates of the reconfigured instruction image toolbar, and store the correlation between the first and second coordinates; and
a conversion part configured to convert a first operation performed on the reconfigured instruction image toolbar displayed at the second coordinates on the screen of the electronic information board apparatus into a second operation on the instruction image toolbar before the reconfiguration displayed at the first coordinates on the screen of the externally connected information processing apparatus based on the stored correlation between the first and second coordinates, and transmit information on the second operation to the externally connected information processing apparatus,
wherein the display part is configured to display the extracted instruction image toolbar before the reconfiguration and the reconfigured instruction image toolbar simultaneously on the same screen of the electronic information board apparatus.

8. The electronic information board system as claimed in claim 7, wherein the display part is configured to display the reconfigured instruction image toolbar that is reduced in size compared with the instruction image toolbar displayed on the screen of the externally connected information processing apparatus.

9. The electronic information board system as claimed in claim 7, wherein the electronic information board apparatus further comprises:
a detection part configured to detect coordinates of a touched position on the screen of the electronic information board apparatus, and determine whether the detected coordinates of the touched position are included in the second coordinates,
wherein the conversion part is configured to
convert the first operation into the second operation and transmit the information on the second operation to the externally connected information processing apparatus, in response to the detection part determining that the detected coordinates of the touched position are included in the second coordinates, and
calculate coordinates of the screen of the information processing apparatus corresponding to the detected coordinates of the touched position, and transmit, along with the calculated coordinates, information on an event corresponding to a mode of touching the position to the information processing apparatus, in response to the detection part determining that the detected coordinates of the touched position are not included in the second coordinates.

10. A method of controlling an electronic information board apparatus, comprising:
receiving an image transmitted from an information processing apparatus externally connected to the electronic information board apparatus, wherein the image is displayed on a screen of the externally connected information processing apparatus and includes an instruction image toolbar to be operated for inputting an instruction to cause the externally connected information processing apparatus to process the received image;
analyzing the received image and extracting the instruction image toolbar from the received image, the instruction image toolbar being displayed at first coordinates on the screen of the externally connected information processing apparatus;
reconfiguring the extracted instruction image toolbar and displaying the reconfigured instruction image toolbar at predetermined second coordinates on a screen of the electronic information board apparatus on which the received image is displayed;
correlating the first coordinates of the instruction image toolbar before the reconfiguration and the second coordinates of the reconfigured instruction image toolbar, and store the correlation between the first and second coordinates; and
converting a first operation performed on the reconfigured instruction image toolbar displayed at the second coordinates on the screen of the electronic information board apparatus into a second operation on the instruction image toolbar before the reconfiguration displayed at the first coordinates on the screen of the externally connected information processing apparatus based on the stored correlation between the first and second coordinates, and transmit information on the second operation to the externally connected information processing apparatus,
wherein the extracted instruction image toolbar before the reconfiguration and the reconfigured instruction image toolbar are displayed simultaneously on the same screen of the electronic information board apparatus.

11. The method as claimed in claim 10, wherein the reconfigured instruction image toolbar that is reduced in size compared with the instruction image toolbar displayed on the screen of the externally connected information processing apparatus is displayed.

12. The method as claimed in claim 10, further comprising:
detecting coordinates of a touched position on the screen of the electronic information board apparatus, and determining whether the detected coordinates of the touched position are included in the second coordinates, wherein the first operation is converted into the second operation and the information on the second operation is transmitted to the externally connected information processing apparatus, in response to determining that the detected coordinates of the touched position are included in the second coordinates, and wherein coordinates of the screen of the information processing apparatus corresponding to the detected coordinates of the touched position are calculated, and information on an event corresponding to a mode of touching the position is transmitted along with the calculated coordinates to the information processing apparatus, in response to determining that the detected coordinates of the touched position are not included in the second coordinates.

* * * * *